(12) United States Patent
Saa-Garriga et al.

(10) Patent No.: US 11,495,190 B2
(45) Date of Patent: Nov. 8, 2022

(54) APPARATUS, METHOD AND COMPUTER PROGRAM FOR DETERMINING CONFIGURATION SETTINGS FOR A DISPLAY APPARATUS

(71) Applicant: SAMSUNG ELECTRONICS CO., LTD., Suwon-si (KR)

(72) Inventors: Albert Saa-Garriga, Staines (GB); Alessandro Vandini, Staines (GB); Antoine Larreche, Staines (GB); Prashant Sharma, Staines (GB); Robert Sharp, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 17/006,405

(22) Filed: Aug. 28, 2020

(65) Prior Publication Data

US 2021/0065649 A1    Mar. 4, 2021

(30) Foreign Application Priority Data

Aug. 30, 2019   (GB) ...................................... 1912531

(51) Int. Cl.
*G09G 5/00* (2006.01)
*G10L 25/51* (2013.01)
(Continued)

(52) U.S. Cl.
CPC ............... *G09G 5/00* (2013.01); *G06N 20/00* (2019.01); *G10L 25/51* (2013.01);
(Continued)

(58) Field of Classification Search
CPC combination set(s) only.
See application file for complete search history.

(56) References Cited

U.S. PATENT DOCUMENTS

| | | |
|---|---|---|
| 10,575,067 B2 | 2/2020 | Ravindran et al. |
| 2010/0053441 A1 | 3/2010 | Tokashiki et al. |
| | (Continued) | |

FOREIGN PATENT DOCUMENTS

| | | |
|---|---|---|
| KR | 101495297 B1 | 2/2015 |
| KR | 1020160084719 A | 7/2016 |
| KR | 10-2017-0002330 A | 1/2017 |

OTHER PUBLICATIONS

International Search Report and Written Opinion dated Dec. 2, 2020 by the International Searching Authority in counterpart International Patent Application No. PCT/KR2020/011089 (PCT/ISA/210, PCT/ISA/220, PCT/ISA/237).

(Continued)

*Primary Examiner* — Wesner Sajous
(74) *Attorney, Agent, or Firm* — Sughrue Mion, PLLC (57) ABSTRACT

Apparatus for determining configuration settings for a display apparatus includes a processor and a memory storing instructions executable by the processor where the processor is configured to determine configuration settings for a display apparatus in dependence on one or more first input parameters indicative of one or more conditions that affect a user experience when a user views content reproduced on the display apparatus, predict an expected user response as a result of operating the display apparatus according to the determined configuration settings, search for an updated set of configuration settings that are expected to produce a user response closer to an intended result than the predicted user response, and control the display apparatus to operate according to the updated set of configuration settings.

20 Claims, 4 Drawing Sheets

(51) Int. Cl.
  *G06N 20/00*   (2019.01)
  *G06N 20/20*   (2019.01)
(52) U.S. Cl.
  CPC . *G09G 2320/0613* (2013.01); *G09G 2320/08* (2013.01); *G09G 2360/144* (2013.01)

(56) References Cited

U.S. PATENT DOCUMENTS

| | | |
|---|---|---|
| 2012/0204201 A1 | 8/2012 | Cassidy et al. |
| 2013/0057573 A1 | 3/2013 | Chakravarthula et al. |
| 2013/0346508 A1 | 12/2013 | Li et al. |
| 2014/0324749 A1 | 10/2014 | Peters et al. |
| 2015/0181289 A1 | 6/2015 | Wheatley |
| 2016/0306494 A1* | 10/2016 | Hewitt ................... G06N 7/005 |
| 2020/0304883 A1 | 9/2020 | Choi et al. |
| 2020/0319877 A1* | 10/2020 | Glazer ................ G06F 11/3051 |

OTHER PUBLICATIONS

"Recommended TV Picture Settings (all brands)", Highfive Success Center, https://success.highfive.com/hc/en-us/articles/360001923611-Recommended-TV-Picture-Settings-all-brands pp. 1-6, 2020.
"Turn on 5G with Ericsson 5G Platform", Ericsson Internal Dec. 19, 2017, Turn on 5G_launch pres MWC 2018_Turn on 5G_c, Ericsson AB 2018, Feb. 8, 2018, 19 pages.
"Antenna Integrated Radio Unit Description—AIR 6488", Ericsson, 213/1551-LZA 701 6001/1 Uen M, Jun. 4, 2019, 133 pages.
Communication dated Apr. 29, 2022, issued by the European Patent Office in European Application No. 20856680.2.

* cited by examiner

APPARATUS, METHOD AND COMPUTER PROGRAM FOR DETERMINING CONFIGURATION SETTINGS FOR A DISPLAY APPARATUS

CROSS-REFERENCE TO RELATED APPLICATION(S)

This application is based on and claims priority under 35 U.S.C. § 119 of British patent application No. 1912531.9, filed on Aug. 30, 2019, in the Intellectual Property Office of the United Kingdom, the disclosure of which is incorporated by reference herein in its entirety.

TECHNICAL FIELD

The present disclosure relates to art apparatus, a method and a computer program for determining configuration settings for a display apparatus.

DESCRIPTION OF RELATED ART

Televisions and other types of display apparatus, for example, seatback displays on aircraft or personal devices such as laptops, tablet computers and smartphones, often provide an array of configuration settings that can be adjusted to change the manner in which content is reproduced at the apparatus. For example, a display apparatus may be switched between different modes each of which is associated with a different set of predefined configuration settings, such as a 'movie mode', 'action mode', 'sport mode' and so on. However, the predefined configuration settings in each mode may not be appropriate for all possible reproduction scenarios.

Some display apparatuses allow users to manually adjust the configuration settings so as to optimise the settings according to their personal preferences and the current conditions. However, it is time-consuming and inconvenient for users to have to manually adjust the configuration settings. As such, many users simply choose to leave the display apparatus set to the default configuration settings.

SUMMARY

According to a first aspect of the present disclosure, there is provided an apparatus comprising a processor and a memory storing instructions executable by the processor where the processor is configured to determine configuration settings for a display apparatus in dependence on one or more first input parameters indicative of one or more conditions that affect a user experience when a user views content reproduced on the display apparatus, predict an expected user response as a result of operating the display apparatus according to the determined configuration settings, search for an updated set of configuration settings that are expected to produce a user response that is closer to an intended result than the predicted user response, control the display apparatus to operate according to the updated set of configuration settings.

In some embodiments according to the first aspect, the processor may be configured, based on a first machine learning algorithm, to receive the one or more first input parameters and output the determined configuration settings.

In some embodiments according to the first aspect, the one or more first input parameters ay comprise one or more descriptors relating to content to be reproduced on the display apparatus.

In some embodiments according to the first aspect, the content to be reproduced on the display apparatus may comprise audio and/or visual content.

In some embodiments according to the first aspect, the one or more first input parameters may comprise one or more environmental parameters each indicative of a property of an environment in which the display apparatus is located.

In some embodiments according to the first aspect, the one or more environmental parameters may comprise at least one of a background noise parameter indicative of a level of background noise in the environment in which the display apparatus is located, an acoustic parameter indicative of an acoustic property in the environment in which the display apparatus is located, and an ambient lighting parameter indicative of an ambient lighting condition in the environment in which the display apparatus is located.

In some embodiments according, to the first aspect, the one or more environmental parameters may be received from one or more first sensors disposed in the environment in which the display apparatus is located.

In some embodiments according to the first aspect, the processor may be configured, based on a second machine learning algorithm, to receive the determined configuration settings as an input vector and to output a score indicative of the predicted user response.

In some embodiments according to the first aspect, the second machine learning algorithm may be configured to receive one or more second input parameters indicative of one or more conditions that affect a user experience when viewing content reproduced on the display apparatus.

In some embodiments according to the first aspect, the one or more second input parameters may be the same as the one or more first input parameters. Alternatively, in other embodiments, the one or more second input parameters may differ from the one or more first input parameters.

In some embodiments according to the first aspect, the processor may be configured to predict the expected user response by predicting whether the display apparatus is expected to capture the user's attention when the content is reproduced on the display apparatus according to the determined configuration settings.

In some embodiments according to the first aspect, during or after reproduction of the content on the display apparatus according to the determined configuration settings, the processor may be configured to receive data indicative of an actual user response to the reproduced content where the second machine learning algorithm is trained to improve an accuracy of future predictions of expected user responses, based on the received data indicative of the actual user response and the configuration settings.

In some embodiments according to the first aspect, the data indicative of the actual user response to the reproduced content may comprise data captured by one or more second sensors arranged to monitor the user.

In some embodiments according to the first aspect, the one or more second sensors may be included in one or more wearable electronic devices.

In some embodiments according to the first aspect, the processor mays be configured to predict the expected user response by predicting an emotional response of the user when the content is reproduced according to the determined configuration settings.

In some embodiments according to the first aspect, during or after reproduction of the content on the display apparatus according to the determined configuration settings, the processor may be configured to receive data indicative of the user's actual emotional response to the reproduced content where the second machine learning algorithm is trained to improve an accuracy of future predictions of expected user responses, based on the received data indicative of the actual user response and the configuration settings.

In some embodiments according to the first aspect, the data indicative of the actual user response to the reproduced content may comprise data captured by one or more second sensors arranged to monitor the user.

In some embodiments according to the first aspect, the one or more second sensors may be included in one or more wearable electronic devices.

In some embodiments according to the first aspect, the processor may be configured, based on a third machine learning algorithm, to receive the determined configuration settings and the predicted user response as an input vector and to output the updated set of configuration settings.

In some embodiments according to the first aspect, the processor may be configured to search for the updated set of configuration settings in dependence on one or more third input parameters indicative of one car more conditions that affect a user experience when viewing content reproduced on the display apparatus.

In some embodiments according to the first aspect, the processor may be configured to receive the predicted user response and information indicative of the intended result where the predicted user response is indicative of whether the determined configuration settings are likely to achieve the intended result.

In some embodiments according to the first aspect, the intended result may be a context-dependent result depending on a genre of the content to the reproduced on the display apparatus.

In some embodiments according to the first aspect, the information indicative of the intended result may comprise metadata indicative of the genre of the content.

According to a second aspect of the present disclosure, there is provided a method comprising: determining configuration settings for a display apparatus in dependence on one or more first input parameters indicative of one or more conditions that affect a user experience when a user views content reproduced on the display apparatus, predicting an expected user response as a result of operating the display apparatus according to the determined configuration settings, searching for an updated set of configuration settings that are expected to produce a user response that is closer to an intended result than the predicted user response, and controlling the display apparatus to operate according to the updated set of configuration settings.

According to a third aspect of the present disclosure, there is provided a computer program comprising instructions which, when the program is executed by one or more processors, cause a computer to carry out a method according to the second aspect.

According to a fourth aspect of the present disclosure, there is provided a non-transitory computer-readable storage medium having stored thereon a computer program according to the third aspect.

According to a fifth aspect of the present disclosure, there is provided an apparatus comprising one or more processors, and a computer-readable memory having stored thereon computer program instructions which, when executed on the one or more processors, cause the apparatus to perform a method according to the second aspect.

BRIEF DESCRIPTION OF THE DRAWINGS

Embodiments of the present disclosure will now be described, by way of example only, with reference to the accompanying drawings, in which.

DETAILED DESCRIPTION

In the following detailed description, only certain exemplary embodiments of the present disclosure have been shown and described, simply by way of illustration. As those skilled in the art would realise, the described embodiments may be modified in various different ways, all without departing from the scope of the present disclosure. Accordingly, the drawings and description are to be regarded as illustrative in nature and not restrictive. Like reference numerals designate like elements throughout the specification.

In the disclosure, terms "have," "may have," "include," "may include," etc. indicate the presence of corresponding features (e.g. a numeral value, a function, an operation, or an element such as a part, etc.), and do not exclude the presence of additional features.

In the disclosure, the terms "a first", "a second", "the first", "the second", or etc. may modify various elements regardless of order and/or importance, and are just used to distinguish an element from another without limiting the elements. For example, a first algorithm, a second algorithm and a third algorithm may refer to algorithms different from each other regardless of the order or importance of the algorithms.

In the disclosure, terms "module", "unit", "part", etc. are used to denote an element that performs at least one function or operation, and such an element may be achieved by hardware, software or a combination of hardware and software. Further, a plurality of "modules", "units", "parts", etc. may be integrated into at least one module or chip as at least one processor except a case where it needs to be used as each individual specific hardware.

The terms used in the disclosure are used to just describe a specific embodiment, and may not intend to limit the scope of another embodiment. Unless otherwise specified clearly in the context, a singular form may include a plural form. The terms used herein including the technological or scientific terms may have the same meanings as those generally understood by a person having ordinary skill in the art. The terms defined in a general dictionary may be construed as having the same or similar meanings as the contextual meanings of the related art, and are not construed as having ideal or excessively formal meanings unless defined clearly in the disclosure. As necessary, even the terms defined in the disclosure may not be construed as excluding embodiments of the disclosure.

Figure 1:
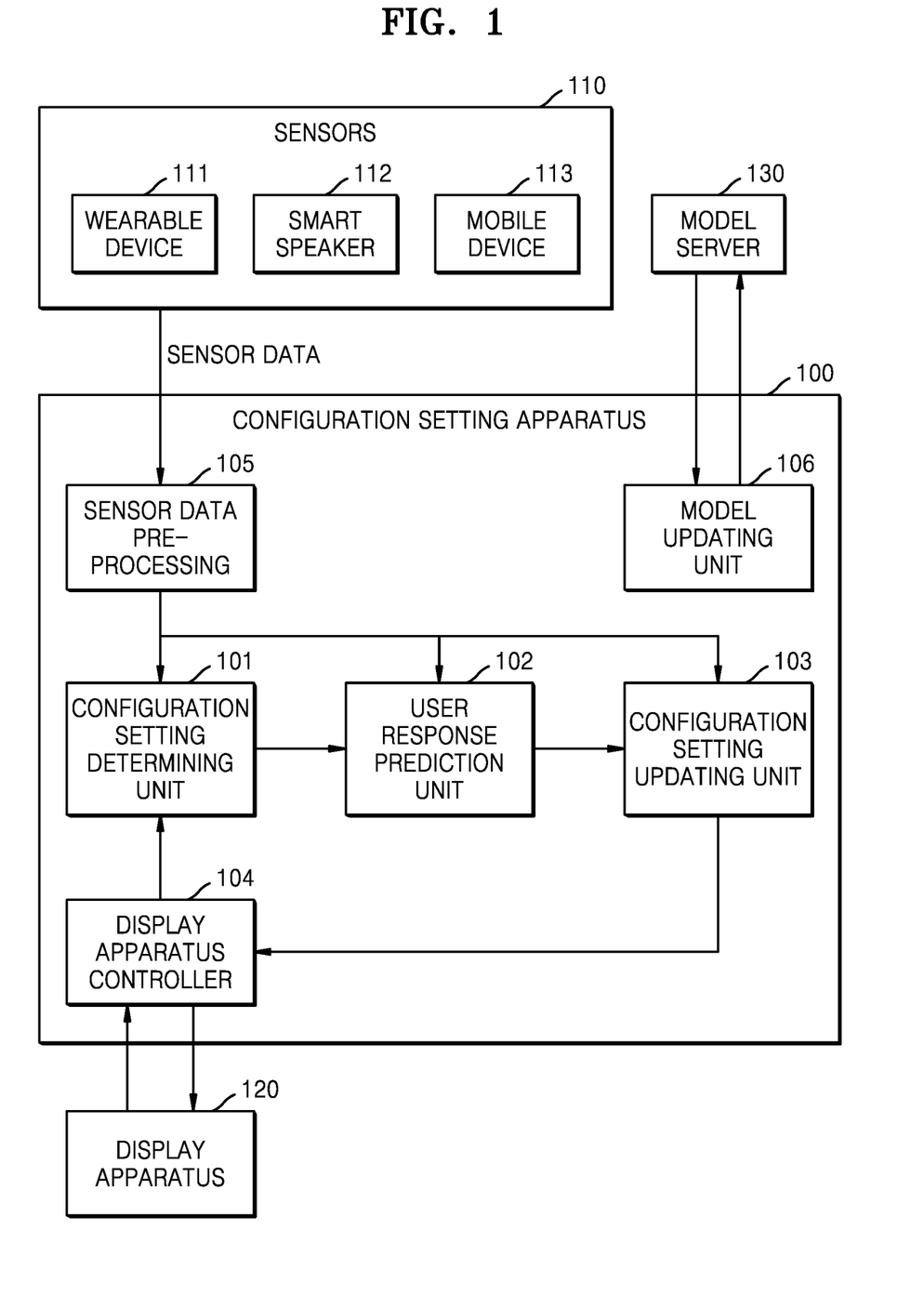
FIG. 1 illustrates an apparatus for determining configuration settings for a display apparatus, according to an embodiment of the present disclosure.

FIG. 1 illustrates an apparatus for determining configuration settings for a display apparatus according to an embodiment of the present disclosure.

The apparatus 100, which is hereinafter referred to as a configuration setting apparatus 100, may comprise a configuration setting determining unit 101, a user response prediction unit 102, a configuration setting updating unit 103, and a display apparatus controller 104. In the present embodiment, the configuration setting determining unit 101, the user response prediction unit 102, and the configuration setting updating unit 103 may be each configured to receive sensor data captured by one or more sensors 110.

The one or more sensors 110 may be disposed in the vicinity of a display apparatus 120 so as to capture data that is indicative of a condition in which a user will experience audio and/or video content that is reproduced by the display apparatus 120. In the present embodiment, the one or more sensors 110 comprise sensors included in a wearable device 111, a smart speaker 112, and a mobile device 113 (e.g., a smartphone or a tablet computer). The configuration setting apparatus 100 may include any suitable communication unit capable of communicating with the one or more sensors 110. For example, the configuration setting apparatus 100 may include a Bluetooth communication unit for communicating with the wearable device, a wireless network interface for communicating with the mobile device 113, and a wired or wireless network interface for communicating with the smart speaker 112.

Examples of types of sensors 110 that may be used to capture the sensor data in embodiments of the present disclosure include, but are not limited to: microphones, camera sensors; light sensors; biometric sensors such as heart rate and/or breathing rate sensors; and Global Navigation Satellite System (GNSS) receivers such as a Global Positioning System (GPS) receiver. For example, in the present embodiment, the configuration setting apparatus 100 may receive heart rate data indicative of the user's current heart rate from a photoplethysmography (PPG) sensor included in the wearable device 111, ambient noise data indicative of a current ambient noise level from a microphone included in the smart speaker 112, and light level data indicative of a current ambient light level from a light sensor included in the mobile device 113. In some embodiments, the sensors 110 may include one or more sensors integrated into the display apparatus 120.

It will be appreciated that the above examples of types of sensors 110 and devices that can provide the sensor data to the configuration setting apparatus 100 are described merely by way of illustration to aid understanding of the disclosure, and should not be construed as limiting.

The configuration setting determining unit 101 is configured to determine configuration settings for the display apparatus 120 in dependence on one or more first input parameters. In the present embodiment, the configuration setting apparatus 100 comprises a sensor data pre-processing unit 105 which derives the one or more first input parameters from the received sensor data, and may also derive other input parameters to be provided to the user response prediction unit 102 and the configuration setting updating unit 103. In other embodiments, the sensor data pre-processing unit 105 may be omitted and the received sensor data may be inputted directly to the configuration setting determining unit 101.

In the present embodiment, the configuration setting determining unit 101 comprises a first machine learning algorithm, for example, a neural network, which is trained to determine a suitable set of configuration settings for the current values of the one or more first input parameters. The configuration settings comprise settings that affect how content is reproduced at the display apparatus, and may relate to the reproduction of different forms of content such as audio and visual content. For example, the configuration settings may include video settings such as brightness, contrast, saturation, clarity, and so on, and/or may include audio settings such as balance, equalizer, surround sound, auto volume adjust gent, and so on.

The first input parameters are each indicative of a condition that affects a user experience when viewing content reproduced on the display apparatus 120. By taking into account conditions that will affect the user experience, for example, the type of content and environmental parameters such as ambient lighting and background noise, the configuration setting determining unit 101 can determine a set of configuration settings that are more appropriate for the current conditions. In some embodiments, the first input parameters may include information about user preferred settings, for example, in the form of settings that have been chosen previously by the user under similar conditions. In this way, the determined configuration settings can take into account the user's personal preferences and so may be more appropriate for the current user.

The user response prediction unit 102 then receives the determined configuration settings from the configuration setting determining unit 101. The user response prediction unit 102 is configured to predict an expected user response based on the configuration settings received from the configuration setting determining unit 101. Here, the predicted user response is a response that is expected as a result of operating the display apparatus 120 according to the determined configuration settings. In the present embodiment, the user response prediction unit 102 comprises a second machine learning algorithm, for example, a neural network, which is trained to predict a likely user response based on the received configuration settings.

The user response prediction unit 102 may be configured to predict different types of user response depending on the embodiment. For example, in some embodiments, the predicted user response may take the form of a binary classifier which indicates whether or not the user is expected to pay attention to the display apparatus 120 as a result of using the determined configuration settings. In such embodiments, one binary value (e.g. '0') may be indicative of a prediction that the user is unlikely to pay attention to the display apparatus 120 as a result of using the determined configuration settings while the other binary value (e.g. '1') may be indicative of a prediction that the user is likely to pay attention to the display apparatus 120 as a result of using the determined configuration settings. In another embodiment, the predicted user response may indicate a predicted emotional response of the user as a result of reproducing content using the determined configuration settings, for example, 'happy', 'sad', 'excited', 'scared', and so on. In yet another embodiment, the predicted user response may be a certain result such as the user falling asleep. For example, in some embodiment, the system may act as a relaxation aid or a 'fall-asleep' aid, which automatically adjusts the configuration settings to help the user to relax or to fall asleep.

The configuration setting updating unit 103 is configured to search for an updated set of configuration settings that are expected to produce a user response that is closer to the intended result than the predicted response. In the present embodiment, the configuration setting updating unit 103 comprises a third machine learning algorithm, for example, a neural network, which is trained to predict a more suitable set of configuration settings based on the determined configuration settings and based on the predicted user response. By training the configuration setting updating unit 103 to predict the user's response for different values of the configuration settings, the apparatus can determine whether or not the determined configuration settings are likely to be effective.

The predicted user response may be compared with an intended response. In some embodiments, the intended result may always be the same in all scenarios and may be referred to as a context-independent result (e.g. 'user is paying attention'. In other embodiments, the intended result can depend upon the context and may be referred to as a context-dependent result. For example, when the content being reproduced has the genre 'comedy', the intended emotional response may be 'happy'. Conversely, when the content being reproduced has the genre 'horror', the intended emotional response may be 'scared', or when the content being reproduced has the genre 'action', the intended emotional response may be 'excited'.

In embodiments in which the intended result is context-dependent, the configuration setting updating unit 103 may also be configured to receive information indicative of the intended result, as an input parameter. For example, the configuration setting updating unit 103 may be configured to receive metadata indicative of the genre of the content that is to be reproduced using the configuration settings via the display apparatus controller 104. However, this type of input may, not be required in embodiments in which the intended result is the same in all scenarios.

Then, the display apparatus controller 104 causes or control the display apparatus 120 to operate according to the updated configuration settings. The display apparatus controller 104 may take different forms depending on the embodiment. For example, in some embodiments, the display apparatus controller 104 may simply transmit the updated configuration settings to the display apparatus 120, which then automatically applies the received configuration settings and starts reproducing content according to the applied configuration settings. In another embodiment, the display apparatus controller 104 may decode audio and/or video content according to the updated configuration settings and output the decoded audio and/or video content to the display apparatus 120.

The display apparatus 120 may comprise a display screen included in the same physical device as the configuration setting apparatus 100, for example, when the content is reproduced on a display screen of a computing device such as a tablet or a smartphone, and the configuration setting determination unit 101, the user response prediction unit 102, and the configuration setting updating unit 103 are implemented as software program instructions executed on the same computing device. In another embodiment, the display apparatus 120 and the configuration setting apparatus 100 may be embodied as physically separate devices. For example, the functions of the configuration setting apparatus 100 may be implemented in a computing device such as a tablet or a smartphone which outputs the updated configuration settings to a separate display apparatus 120 such as a digital television.

Figure 2:
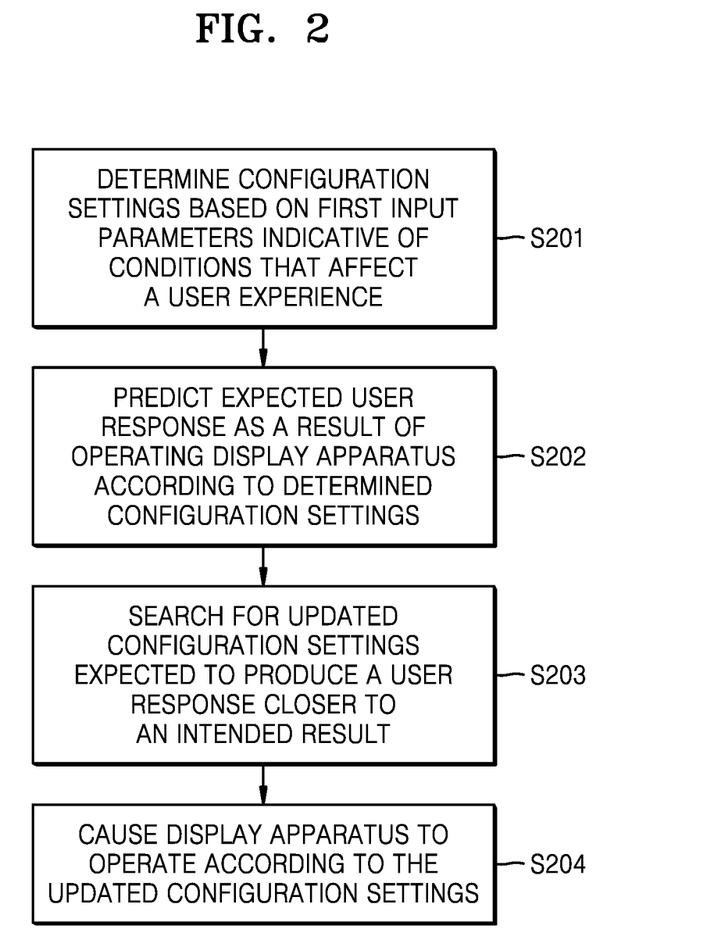
FIG. 2 is a flowchart showing a method of determining configuration settings for a display apparatus, according to an embodiment of the present disclosure.

FIG. 2 is a flowchart illustrating a method for-determining configuration settings for a display apparatus according to an embodiment of the present disclosure.

Referring to FIG. 2, an apparatus (e.g., the configuration setting apparatus 100) may determine configuration settings for the display apparatus in dependence on one or more first input parameters in step S201. For example, the configuration setting determining unit 101 may determine the configuration settings for the display apparatus in dependence on the one or more first input parameters in step S201.

In step S202, the apparatus may predict an expected user response based on the determined configuration settings. For example, the user response prediction unit 102 may receive the determined configuration settings from the configuration setting determining unit 101 and predict the expected user response based on the configuration settings determined in step S201. The predicted user response is a response that is expected as a result of operating the display apparatus 120 according to the determined configuration settings.

In step S203, the apparatus may search for an updated set of configuration settings that are expected to produce a user response that is closer to the intended result than the response predicted in step S202. For example, the configuration setting updating unit 103 may predict, using the third machine learning algorithm, a more suitable set of configuration settings based on the configuration settings determined in step S201 and based on the user response predicted in step S202.

In step S204, the apparatus may control the display apparatus 120 to operate according to the updated set of configuration settings. For example, the display apparatus controller 104 may cause the display apparatus 120 to operation according to the configuration settings updated in step S203.

The functions of the configuration setting determining unit 101, the user response prediction unit 102, and the configuration setting updating unit 103 will now be described in more detail with reference to FIGS. 1, 3 and 4.

Figure 3:
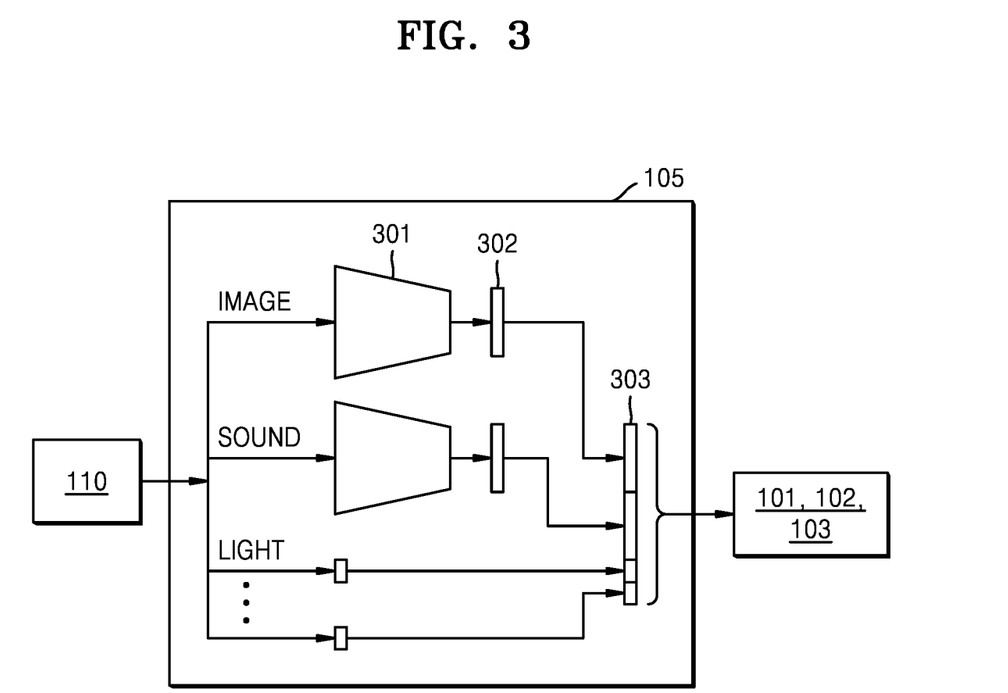
FIG. 3 illustrates a sensor data pre-processing unit, according to an embodiment of the present disclosure.

FIG. 3 illustrates the sensor data pre-processing unit 105 according to embodiments of the present disclosure.

As described above, in the present embodiment, the configuration setting determining unit 101, the user response prediction unit 102, and the configuration setting updating unit 103 respectively comprise first, second and third machine learning algorithms. In the present embodiment, the first, second and third machine learning algorithms are configured to receive a vector of input parameters derived by the sensor data pre-processing unit 105, as shown in FIG. 3. The sensor data received from the sensors 110 can take various forms, and the format in which the data is received may vary depending on the type of sensor and/or the type of device which provides the data.

Accordingly, in the present embodiment, the sensor data pre-processing unit 105 comprises one or more neural networks 301, each of winch is configured to normalise a certain category of sensor data (e.g. image data or sound data) and output a normalised descriptor in the form of a vector 302 that describes a property of the input sensor data. In some embodiments, normalisation may not be required, for example, when dealing with types of sensor data that are provided in a standardised format.

The full set of input parameters 303 for the configuration setting determining unit 101, the user response prediction unit 102, and the configuration setting updating unit 103, normalised vectors 302 comprise the normalised vectors 302 together with any unprocessed sensor data for which normalisation was not required. Depending on the embodiment, the full set of input parameters 303 may be provided to each of the first machine learning algorithm in the configuration setting determining unit 101, the second machine learning algorithm in the user response prediction unit 102, and the third machine learning algorithm in the configuration setting updating unit 103, or each algorithm of the first, second and third machine learning algorithms may be configured to receive a different subset of the input parameters 303. The parameters that are provided to each of the fast, second and third machine learning algorithms are hereinafter referred to as the first, second and third input parameters, respectively.

Configuration Setting Determining Unit

The configuration setting determining unit 101 of the present embodiment comprises a first machine learning algorithm, as described above. The first input parameters received by the first machine learning algorithm are each indicative of a condition that affects a user experience when viewing content reproduced on the display apparatus 120. For example, the first input parameters can comprise one or more environmental parameters, each of which is indicative of a property of the environment in which the display apparatus 120 is located. The environmental parameters can be derived by the sensor data pre-processing unit 105 from sensor data received from one or more sensors 110 disposed in the environment in which the display apparatus 120 is located, or may consist of the as-received sensor data.

Examples of types of environmental parameters that can be included in the first input parameters include, but are not limited to: a background noise parameter indicative of a level of background noise in the environment in which the display apparatus is located; an acoustic parameter indicative of an acoustic property in the environment in which the display apparatus is located; and an ambient lighting parameter indicative of an ambient lighting condition in the environment in which the display apparatus is located. Examples of other types of information that can be included in the first input parameters include, but are not limited to, one or more descriptors relating to content to be reproduced on the display apparatus 120, for example, image data relating to a frame of video content; and current configuration settings used by the display apparatus 120.

The first machine learning algorithm can be trained to learn the mapping between different combinations of values of the first input parameters and the associated configuration settings that are selected by users. In this way, the first machine learning algorithm can leant to identify a suitable set of configuration settings for any given combination of first input parameters so as to be able to determine a customised set of configuration settings that are appropriate for the current conditions. The first machine learning algorithm can be trained by comparing its predicted settings with a ground truth, which comprises a set of settings selected by a user at the current time. Once trained, the first machine learning algorithm should be capable of predicting a set of settings that are the same as the ground truth. Here, the ground truth could be obtained based on a user history for the display apparatus 120, and/or based on reference data obtained from 'expert' users.

The first machine learning algorithm may be trained in an offline training process, which can be carried out before deployment of the configuration setting apparatus 100, in which the first machine learning algorithm is trained on expert user settings to provide an initial model. Then, during use of the configuration setting apparatus 100 by an end-user, an online training process can be used in which the first machine learning algorithm is re-trained using; data from the current user or users as a ground truth. In this way, the first machine learning algorithm can be trained over time to output configuration settings that take into account the preferences of the current user or users of the display apparatus 120.

In the present embodiment, the output of the first machine learning algorithm is a neural network-based regression of the configuration settings implemented using a linear layer as a final layer of the network, which can be represented by floating point variables. However, in other embodiments, a different form of machine learning algorithm may be used.

Furthermore, in some embodiments, the configuration setting determining unit 101 may not comprise a machine learning algorithm. For example, in some embodiments, the configuration setting determining unit 101 may be implemented as a Finite State Machine configured according to predefined rules. However, a machine learning algorithm may be advantageous since this can allow the configuration setting determining unit 101 to adapt to new forms of content and/or to adapt to situations that may not have been anticipated when defining the rules for a Finite State Machine embodiment.

User Response Prediction Unit

The user response prediction unit 102 of the present embodiment comprises a second machine learning algorithm, as described above. The second machine learning algorithm is configured to take as an input the configuration settings determined by the first machine learning algorithm. Additionally, the second machine learning algorithm may receive one or more second input parameters indicative of one or more conditions that affect a user experience when viewing content reproduced on the display apparatus. Depending on the embodiment, the second input parameters may be the same as the first input parameters or may differ from the first input parameters. By taking the current conditions into account, for example, information about environmental conditions and/or information about the type of content to be reproduced, the second machine learning algorithm can more accurately predict the likely response of the user when the content is reproduced using the determined configuration settings.

As with the first learning algorithm, offline and online training can be applied to the second learning algorithm. Prior to deployment, the second machine learning algorithm can be trained offline by providing the algorithm with a given set of input parameters, including a set of configuration settings, and comparing the predicted user response with an actual (i.e., observed) user response when the content is reproduced using the set of input configuration settings. In this way, an initial model for the second machine learning algorithm can be generated which maps the second input parameters onto the user response.

Then, once the configuration setting apparatus 100 is in use, online training can be used in embodiments in which the configuration setting apparatus 100 is able to obtain information about the user's actual response when the content is reproduced using the updated configuration settings. In this way, the second machine learning algorithm can be trained over time to more accurately predict the response of a particular user or group of users. Information for use as a ground truth in online training of the second machine learning algorithm can be obtained by one or more second sensors arranged to monitor the user. Examples of types of sensors that can be used to obtain data for training the second machine learning algorithm include biometric sensors included in a wearable electronic device 111 worn by the user, and gaze tracking sensors arranged to determine current direction of a user's gaze. For example, data from a gaze tracking sensor may be indicative of whether the user is currently looking at the display apparatus 120, and as such it may provide an indication of whether the user is currently paying attention to the display apparatus 120. Data from a biometric sensor, such as a PPG sensor, may be indicative of the user's emotional response to the content that is currently being reproduced.

As a further example, a level of background noise detected by a microphone may be indicative of the current level of attention of a group of users since a high level of background noise may indicate that the users are talking among themselves and are only paying a low level of attention to the display apparatus 120. As yet another example, at image sensor may be used to capture images of a room in which the display apparatus 120 is located, and a suitable image recognition algorithms may be used to detect faces or people within the room. The number of users in the captured image may be counted and compared with a previous number of users before the updated configuration settings were applied. An increase in the number of counted users may be taken as an indication that a higher level of attention is being paid to the display apparatus 120 since more users are now watching the content. Conversely, a decrease in the number of counted users may be taken as an indication that the display apparatus 120 is now commanding a lower level of attention.

In the present embodiment, the output of the second machine learning algorithm is a binary classifier in which a value of 0 indicates a low predicted level of attention and a value of 1 indicates a high predicted level of attention. The second machine learning algorithm can be implemented using fully connected layers followed by logistic sigmoid as a final layer of the network with a cross entropy loss, represented by floating point variables. In other embodiments, a different form of machine learning algorithm may be used, for example, the second machine learning algorithm may be configured to output a classification indicative of one of a plurality of different types of emotional response. Furthermore, in some embodiments, the user response prediction unit 102 may not comprise a machine learning algorithm. For example, in some embodiments, the user response prediction unit 102 may be implemented as a Finite State Machine configured according to predefined rules.

Configuration Setting Updating Unit

The configuration setting updating unit 103 of the present embodiment comprises a third machine learning algorithm, as described above. The third machine learning algorithm is configured to take as an input the configuration settings determined by the first machine learning algorithm, and the predicted user response determined by the second machine learning algorithm. This allows the third machine learning algorithm to determine whether a set of updated configuration settings exist that are expected to produce a user response that more closely matches the intended result, for example, to find a set of configuration settings that will increase the user's level of attention.

Additionally, in some embodiments, the third machine learning algorithm may be configured to receive one or more third input parameters indicative of one or more conditions that affect a user experience when viewing content reproduced on the display apparatus. In this way, the third machine learning algorithm can take into account the current conditions when determining the updated configuration settings. Depending on the embodiment, the third input parameters may be the same as the first and/or second input parameters, or may differ from the first and/or second input parameters.

By using the configuration setting updating unit 103 to automatically find an updated set of configuration settings, the configuration setting apparatus 100 can try to adapt the configuration settings to increase the user's attention, or to obtain another intended result such as a specific emotional response without requiring input from the user. This automated approach can be particularly advantageous in situations in which the user rarely, or never, manually changes the configuration settings of the display apparatus 120.

Like the second machine learning algorithm, the third machine learning algorithm can be trained over time to identify more suitable configuration settings for a particular user or group of users, by using information about the user's actual response when the content is reproduced using the updated configuration settings as a ground truth. In the present embodiment, the configuration setting updating unit 103 comprises a reinforcement learning agent that is used for online training of the third machine learning algorithm. The reinforcement learning algorithm receives rewards when the updated configuration settings predicted by the third machine learning algorithm are observed to produce a user response that is closer to the intended response than the response that was predicted by the user response prediction unit 102.

Also, as described above, in some embodiments, the intended response may be context-sensitive, for example, when different emotional responses are intended depending on the content that is being reproduced. In one such embodiment, the intended result may be dependent on a genre of the content to be reproduced on the display apparatus, and the third machine learning algorithm may be configured to receive information indicative of the intended result in the form of metadata that is indicative of the genre. This allows the third machine learning algorithm to adaptively predict configuration settings that are more likely to produce the desired emotional response in different contextual situations.

In the present embodiment, the output of the third machine learning algorithm is a multiple class classifier, in which each class represents an action. The third machine learning algorithm is implemented using fully connected layers followed by softmax as a final layer of the network with a cross entropy loss, the output of which is represented by floating point variables that are used as the updated configuration settings. However, in other embodiments, a different form of machine learning algorithm may be used. Furthermore, in some embodiments, the configuration setting updating unit 103 may not comprise a machine learning algorithm. For example, in some embodiments, the configuration setting updating unit 103 may be implemented as a Finite State Machine configured according to predefined rules.

Figure 4:
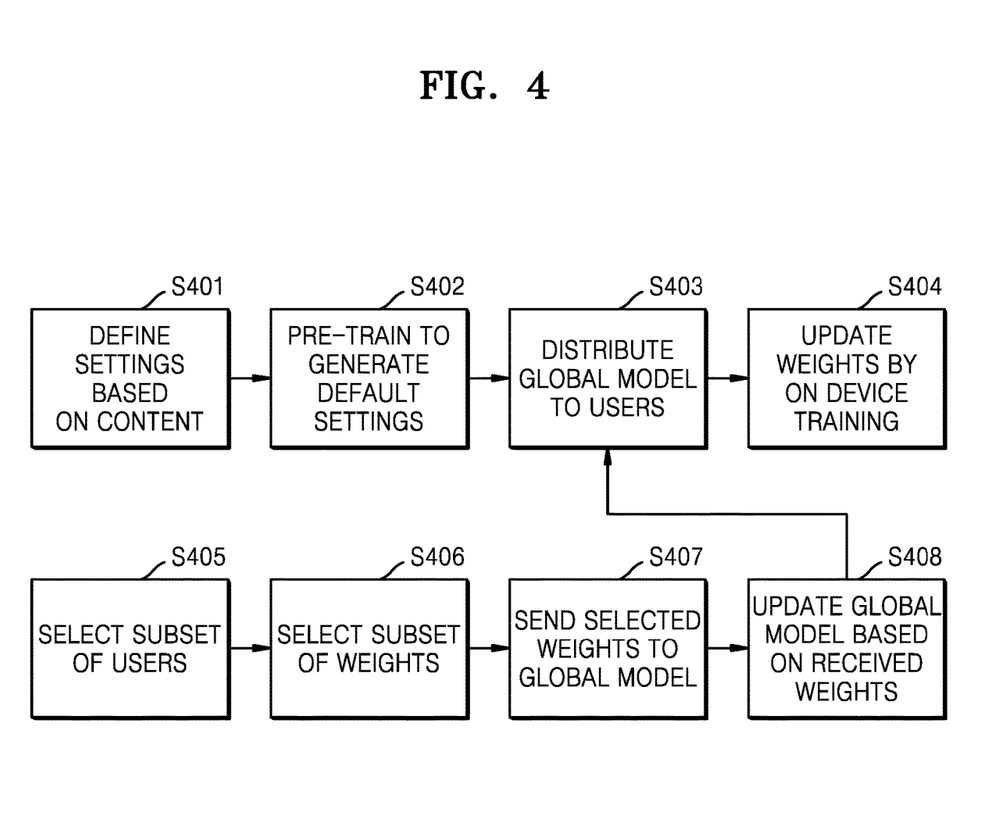
FIG. 4 is a flowchart showing a method of updating a model based on data from a plurality of users, according to an embodiment of the present disclosure.

FIG. 4 is a flowchart showing a method of updating a model based on data from a plurality of users according to an embodiment of the present disclosure. The approach illustrated in FIG. 4 may be referred to as 'federated learning'. The method illustrated in FIG. 4 can be implemented us the model updating unit 106 of FIG. 1, which communicates with a model server 130 that stores a global model.

In step S401, a plurality of different sets of configuration settings are defined, each of which corresponds to a different type of content. For example, one set of configuration settings may relate to a 'movie' mode, another set may relate to a 'sports' mode, and so on. In step S401 the settings may be set by one or more 'expert' users, and may be referred to as 'expert settings', may be determined automatically using a machine learning algorithm. Depending on the embodiment, the settings defined in step S401 may or may not take into account other factors such as properties of different types of environment in which the content is to be reproduced. For example, different expert settings may be provided for different types of environment.

Next, in step S402 the first machine learning algorithm is pre-trained prior to deployment of the system, by training the first machine learning algorithm to generate the different sets of configuration settings defined in step S401. The resulting weights of the first machine teaming are then distributed among users as a 'global' model in step S403. Steps S401 to S403 therefore relate to an 'offline' training process as described above. In step S404, online training is performed to update the weights in a local copy of the global model, that is, a local model that is stored and trained in a particular configuration setting apparatus 100.

In the 'federated learning' approach, the global model is updated after the configuration setting apparatus 100 has been deployed and is in use by a plurality of users. In step S405, a subset of the total number of users is selected, and, in step S406, a subset of weights are selected from each user's local model. The subset of weights can be selected in step S406 by masking and/or sparsifying the full set of weights of the local model so as to obtain anonymised data that cannot be used to identify a particular user. In this way, a user's privacy can be protected. Each one of the selected users then transmits the subset of weights to the server 130 in step S407, which uses the received weights to update the global model in S408. The updated model can then be pushed to other users' devices in step S403.

In some embodiments, a method similar to the one shown in FIG. 4 can be adapted to group users into clusters, which may also be referred to as communities. Each user community comprises a group of users that share similar characteristics, for example, users from a similar demographic group or in a similar geographic location. The subset of users that is selected in step S405 can be a single community, and after updating the global model in step S408, the new version of the model can be pushed to all users in the community in step S403. In this way, the server 130 may store a different version of the global model for each user community. Since users within the same community may tend to exhibit similar preferences for configuration settings under similar conditions, a community-based approach can allow a more accurate global model to be maintained for each community, and accordingly can allow more accurate predictions to be made within each community.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device. The computer-readable recording medium may be given in the form of a non-transitory storage medium. Here, the term 'non-transitory' means that the storage medium is tangible excluding a signal (e.g. an electromagnetic wave), and does not distinguish between a case where data is semi-permanently stored in the storage medium and a case where data is transitorily stored in the storage medium.

While certain embodiments of the disclosure have been described herein with reference to the drawings, it will be understood that many variations and modifications will be possible without departing from the scope of the discourse as defined in the accompanying claims.

The invention claimed is:

1. An apparatus comprising:
a memory storing instructions; and
a processor configured to execute the instructions to:
determine, by using a first machine learning algorithm among a plurality of machine learning algorithms, configuration settings for a display apparatus in dependence on one or more first input parameters indicative of one or more conditions that affect a user experience when a user views content reproduced on the display apparatus;
predict, by using a second machine learning algorithm among the plurality of machine learning algorithms, an expected user response as a result of operating the display apparatus according to the determined configuration settings;
search for an updated set of configuration settings that are expected to produce a user response that is closer to an intended result than the predicted user response; and
control the display apparatus to operate according to the updated set of configuration settings,
wherein the processor is further configured to execute the instructions to obtain the updated set of configuration settings by using a third machine learning algorithm among the plurality of machine learning algorithms based on the determined configuration settings and the predicted user response,
wherein the third machine learning algorithm is configured to take as an input the configuration settings determined by using the first machine learning algorithm and the user response predicted by using the second machine learning algorithm, and wherein the plurality of machine learning algorithms are different from each other.

2. The apparatus according to claim 1, wherein the processor is further configured to execute the instructions to, based on the first machine learning algorithm, receive the one or more first input parameters and output the determined configuration settings.

3. The apparatus according to claim 1, wherein the one or more first input parameters comprise one or more descriptors relating to content to be reproduced on the display apparatus.

4. The apparatus according to claim 3, wherein the content to be reproduced on the display apparatus comprises audio and/or visual content.

5. The apparatus according to claim 1, wherein the one or more first input parameters comprise one or more environmental parameters each indicative of a property of an environment in which the display apparatus is located.

6. The apparatus according to claim 5, wherein the one or more environmental parameters comprise at least one of:
a background noise parameter indicative of a level of background noise in the environment in which the display apparatus is located;
an acoustic parameter indicative of an acoustic property of the environment in which the display apparatus is located; and
an ambient lighting parameter indicative of an ambient lighting condition in the environment in which the display apparatus is located.

7. The apparatus according to claim 5, wherein the one or more environmental parameters are received from one or more first sensors disposed in the environment in which the display apparatus is located.

8. The apparatus according to claim 1, wherein the processor is further configured to execute the instructions to, based on the second machine learning algorithm, receive the determined configuration settings as an input vector and to output a score indicative of the predicted user response.

9. The apparatus according to claim 8, wherein the second machine learning algorithm is configured to receive one or more second input parameters indicative of one or more conditions that affect a user experience when the user views the content reproduced on the display apparatus.

10. The apparatus according to claim 1, wherein the processor is further configured to execute the instructions to predict the expected user response by predicting whether the display apparatus is expected to capture the user's attention when the content is reproduced on the display apparatus according to the determined configuration settings.

11. The apparatus according to claim 8, wherein during or after reproduction of the content on the display apparatus according to the determined configuration settings, the processor is further configured to execute the instructions to receive data indicative of an actual user response to the reproduced content, and
    wherein the second machine learning algorithm is trained to improve an accuracy of future predictions of expected user responses based on the received data indicative of the actual user response and the configuration settings.

12. The apparatus of claim 11, wherein the data indicative of the actual user response to the reproduced content comprises data captured by one or more second sensors arranged to monitor the user.

13. The apparatus according to claim 1, wherein the processor is further configured to execute the instructions to predict the expected user response by predicting an emotional response of the user when the content is reproduced according to the determined configuration settings.

14. The apparatus of claim 1, wherein the processor is further configured to execute the instructions to, based on the third machine learning algorithm, receive the determined configuration settings and the predicted user response as an input vector and to output the updated set of configuration settings.

15. The apparatus of claim 1, wherein the processor is further configured to execute the instructions to search for the updated set of configuration settings in dependence on one or more third input parameters indicative of one or more conditions that affect a user experience when the user views the content reproduced on the display apparatus.

16. The apparatus of claim 1, wherein the processor is further configured to execute the instructions to receive the predicted user response and information indicative of the intended result, and
    wherein the predicted user response is indicative of whether the determined configuration settings are likely to achieve the intended result.

17. The apparatus of claim 16, wherein the intended result is a context-dependent result depending on a genre of the content to be reproduced on the display apparatus.

18. The apparatus of claim 17, wherein the information indicative of the intended result comprises metadata indicative of the genre of the content.

19. A method comprising:
    determining, by using a first machine learning algorithm among a plurality of machine learning algorithms, configuration settings for a display apparatus in dependence on one or more first input parameters indicative of one or more conditions that affect a user experience when a user views content reproduced on the display apparatus;
    predicting, by using a second machine learning algorithm among the plurality of machine learning algorithms, an expected user response as a result of operating the display apparatus according to the determined configuration settings;
    searching for an updated set of configuration settings that are expected to produce a user response that is closer to an intended result than the predicted user response; and
    controlling the display apparatus to operate according to the updated set of configuration settings,
    wherein the searching for the updated set of configuration settings comprises obtaining the updated set of configuration settings by using a third machine learning algorithm among the plurality of machine learning algorithms, based on the determined configuration settings and the predicted user response,
    wherein the third machine learning algorithm is configured to take as an input the configuration settings determined by using the first machine learning algorithm and the user response predicted by using the second machine learning algorithm, and
    wherein the plurality of machine learning algorithms are different from each other.

20. A non-transitory computer-readable medium storing instructions to be executed by one or more processors for performing a method comprising:
    determining, by using a first machine learning algorithm among a plurality of machine learning algorithms, configuration settings for a display apparatus in dependence on one or more first input parameters indicative of one or more conditions that affect a user experience when a user views content reproduced on the display apparatus;
    predicting, by using a second machine learning algorithm among the plurality of machine learning algorithms, an expected user response as a result of operating the display apparatus according to the determined configuration settings;
    searching for an updated set of configuration settings that are expected to produce a user response that is closer to an intended result than the predicted user response; and
    controlling the display apparatus to operate according to the updated set of configuration settings,
    wherein the searching for the updated set of configuration settings comprises obtaining the updated set of configuration settings by using a third machine learning algorithm among the plurality of machine learning algorithms, based on the determined configuration settings and the predicted user response,
    wherein the third machine learning algorithm is configured to take as an input the configuration settings determined by using the first machine learning algorithm and the user response predicted by using the second machine learning algorithm, and wherein the plurality of machine learning algorithms are different from each other.

* * * * *